R. M. LOVEJOY.
SHOCK ABSORBER.
APPLICATION FILED JAN. 29, 1917.
1,324,913.
Patented Dec. 16, 1919.
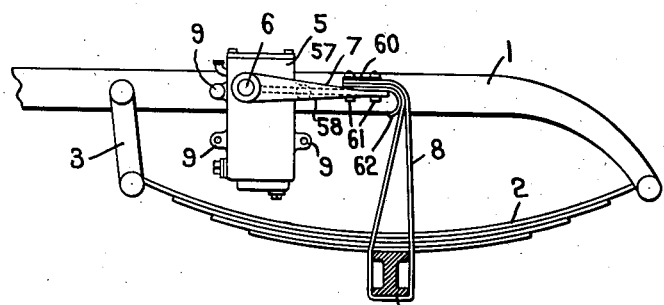
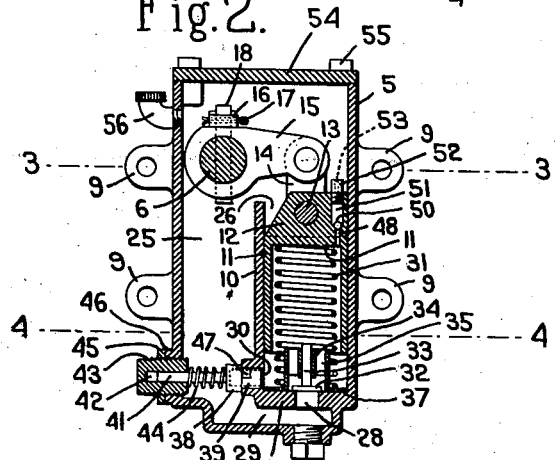
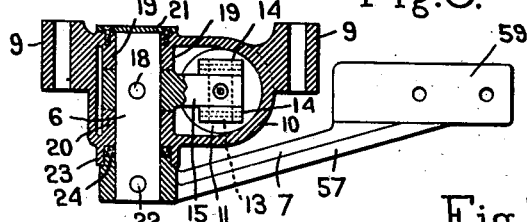
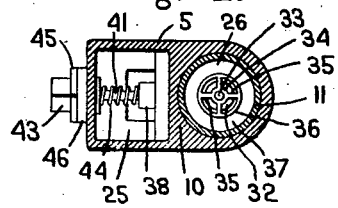
Inventor.
Ralph M. Lovejoy
by Heard Smith & Tennant.
Attys.

UNITED STATES PATENT OFFICE.

RALPH M. LOVEJOY, OF MEREDITH, NEW HAMPSHIRE.

SHOCK-ABSORBER.

1,324,913.   Specification of Letters Patent.   Patented Dec. 16, 1919.

Application filed January 29, 1917. Serial No. 145,126.

*To all whom it may concern:*

Be it known that I, RALPH M. LOVEJOY, a citizen of the United States, and resident of Meredith, county of Belknap, State of New Hampshire, have invented an Improvement in Shock-Absorbers, of which the following description, in connection with the accompanying drawing, is a specification, like characters on the drawing representing like parts.

This invention relates to improvements in stock absorbers for cushioning the movement of two relatively movable members and the main object of the invention is to provide a relatively small cushioning device which will operate effectively through a wide range of movement of the relatively movable members and which can be readily applied to different types of mechanisms such as various different kinds of vehicles.

In the usual types of shock absorbers for automobiles and other vehicles it is ordinarily necessary to provide special brackets which are of expensive construction and which must be applied to the frame and axle in such a manner as to permit the relatively reciprocating parts of the shock absorber to have rectilinear movements and frequently difficulty is encountered in satisfactorily positioning such parts upon the frame of the machine.

One of the objects of the present invention is to provide a shock absorber which may be attached directly to the frame of the machine and which is provided with a flexible connection to the axle thereby avoiding the necessity of careful positioning of the parts required in usual forms of shock absorbers.

Another object of the invention is to provide a shock absorber of a conveniently small character in which the effective parts have a relatively wide range of movement thereby enabling the shock to be gradually dissipated.

Another feature of the invention consists in providing a hydraulic shock absorber in which leakage of the fluid is entirely prevented.

Another object of the invention is to produce a shock absorber which by its inherent construction will be prevented from rattling notwithstanding slight wear of the parts.

Other objects and features of the invention will more fully appear from the accompanying description, and drawings, and will be particularly pointed out in the appended claims.

The drawings illustrate a preferred embodiment of my invention as applied to the front and rear axle of an automobile.

Figure 1 of the drawing shows the end of the frame of an automobile supported by a spring upon the usual axle with the shock absorber embodying my invention applied to the same, Fig. 2 is a vertical sectional view of the shock absorber, Fig. 3 is a transverse sectional view on lines 3—3, Fig. 2, Fig. 4 is a transverse sectional view on lines 4—4, Fig. 2 looking downwardly, Fig. 5 is a detail sectional view of the relief valve.

A preferred embodiment of the invention is illustrated herein as applied to the frame of an automobile which as shown in Fig. 1 comprises a main girder or side frame 1 having a downwardly bent end to which one end of a spring 2 is attached, the other end of said spring being secured by a link 3 to the frame much in the usual manner. The spring rests intermediate of its ends upon the usual axle 4.

The shock absorber is secured to the main frame and comprises a casing 5 having mounted therein a rock shaft 6 having a relatively long arm 7 which is connected by a flexible member such as a strap 8 to the axle 4. The casing 5 preferably is attached directly to the frame 1 and may conveniently be provided with two or more pairs of lugs 9 enabling it to be positioned at any desired height from the frame.

In the preferred form of shock absorber which is illustrated herein the casing 5 is substantially rectangular in cross section and is provided with an interior integral cylindrical wall 10 which is bored longitudinally to form a cylinder to receive a preferably hollow piston 11.

The upper end of the piston is provided with a boss 12 which is pivotally connected by a stud 13 to links 14 which in turn are pivotally connected to the end of an arm 15 upon the rock shaft 6.

In order conveniently to secure the arm 15 to the rock shaft 6 the arm is provided with a boss 16 which is transversely apertured to receive a cotter pin 17 which extends through the upper end of a pin 18 inserted through the arm 15 and rock shaft 6. The rock shaft 6 is mounted in bosses 19, 20 projecting inwardly from the casing, one end of the rock shaft preferably being covered by a plate 21 screwed upon the side of the casing to prevent leakage.

The other end of the rock shaft projects beyond the end of the casing and the arm 7 is secured upon it by a pin 22 or other suitable fastening. In order to prevent dust from entering the casing and also to prevent leakage the side of the casing preferably is provided with an annular flange 23 which incloses and fits tightly upon a reduced portion 24 upon the hub of the arm 7, a suitable gasket being interposed therebetween.

The interior of the casing 5 constructed in the manner above described provides a fluid chamber 25 and an inclosed cylinder 26.

It will be obvious that the shock absorber may be constructed with the cylinder 26 outside of the casing 5 which forms the wall of the fluid supply chamber 25 but for convenience in construction and to provide against leakage of fluid it is desirable that the cylinder shall be located within the casing 5 so that any overflow of fluid from the cylinder will be returned directly to the fluid chamber. This construction furthermore is of a character which can be very easily made since the casing and the inclosed cylinder wall may be cast in one piece and the cylinder bored from the upper open end of the casing.

The lower head 27 of the cylinder preferably is provided with a central admission port 28 which communicates with a passage 29 leading to the fluid chamber 25. The cylinder is also provided with a lateral port 30 which provides a discharge port for the oil within the cylinder and through which the flow of fluid is controlled by a spring actuated valve in the manner hereinafter to be described.

In the operation of the device it is desirable that tension be always maintained upon the flexible member 8 so that rattling of the parts will be prevented and in order that the shock resisting members shall be positioned to act immediately to dissipate any shock due to the relative movement of the axle 4 and frame 1. In order to accomplish this purpose resilient means are provided for normally raising the arm 7 so as to maintain the flexible member 8 taut. The preferred means for accomplishing this purpose consists of a helical spring 31 which preferably is inclosed in the hollow piston and is seated at its lower end upon the head 27 of the cylinder.

Inasmuch as the shock absorber of the present construction is intended to resist relative movement of the movable members in one direction only, means are provided for permitting the fluid to flow freely from the fluid chamber 25 into the cylinder and to resist the flow of fluid in the opposite direction.

In the preferred embodiment illustrated herein a valve is provided for the port 28 within the cylinder 26. This valve may conveniently be a disk 32 provided with a central stem 33 slidably mounted in a cage comprising a central boss 34 connected by radial arms 35 to a cylindrical supporting casing 36 having a flange 37 resting upon the upper surface of the cylinder head 27.

The spring 31 may conveniently be seated upon the flange 37 thereby maintaining the cage in proper position without the necessity of otherwise securing the same to the cylinder head. The valve 32 desirably is a free valve which is raised by the upward flow of the fluid through the port 28 and closed upon cessation of such flow.

In order to dissipate the shock a novel means is provided for releasing gradually the oil in the cylinder when the piston is forced downwardly by the relative movement of the frame and axle. Such means comprises a valve 38 preferably having a tubular extension 39 telescopically seated in the lateral port 30, said valve desirably being provided with a vent 40 adapted to discharge fluid from the cylinder directly into the fluid chamber and thereby to provide means for compensating for slight vibrations of the piston.

The valve 38 is maintained in closed position by resilient means which will permit it to yield when a heavy pressure is imposed upon the fluid by the descent of the piston under a heavy shock.

In the preferred construction illustrated herein the valve 38 is provided with a stem 41 which is slidably mounted in a guideway 42 in a screw threaded bushing 43 which is seated in the screw threaded wall of the casing directly opposite the port 30.

A helical spring 44 surrounding said valve stem 41 and bearing at one end upon the bushing and at the other end against the valve 38 provides a means for normally holding the valve in closed position. By reason of the screw threaded connection between the bushing 43 and the casing 5 the bushing may be adjusted to place the spring 44 under greater or less compression and thereby regulate the amount of pressure necessary to displace the valve.

The bushing may be located in adjusted position by a set nut 45 screwed upon the bushing and abutting the face of a boss 46 extending laterally from the casing and providing a thickened wall to hold the bushing.

By constructing the bushing 43 in such a manner that it is of greater diameter than the valve a convenient means is provided for machining and assembling the parts since the port 30 may be bored and the valve seat finished by introducing suitable tools through the aperture which is to receive the bushing.

The tubular portion 39 of the valve 38 is provided, in addition to the vent 40 with a large port 47 which discharges the fluid from the cylinder into the fluid chamber when the valve 38 is forced from its seat by the heavy pressure upon the fluid within the cylinder. By thus providing a lateral discharge port an unbalanced valve is formed which will not chatter or sing when the fluid is forced through it under great pressure against the action of the spring which tends to keep the valve seated. Other forms of yieldable valves may be employed but in any case it is essential that the valve shall be adapted to permit the discharge of more fluid at one side than the other so that the chattering of a balanced valve will be avoided.

By employing a spring of suitable strength the flow of the fluid from the cylinder into the fluid chamber, the resistance to heavy pressure imposed by the liquid in the cylinder may be impeded to any desired extent. Also the shock absorber may, by utilization of springs of different strength, be adapted to operate either under light shocks or heavy shocks. The device therefore is capable of adaptation to any form of vehicle from a light runabout to heavy touring cars and to similar uses in other fields.

In assembling the shock absorber upon a vehicle such as an automobile the casing 5 is bolted directly to the frame 1 in such a position that the end of the arm 7 extends over the axle 4. By reason of the fact that the arm 7 is connected to the axle 4 by a flexible member 8, which may be a leather or webbing strap, or even a window cord, no great accuracy is required in positioning the shock absorber upon the frame and it may therefore be placed in such manner as not to interfere with other mechanisms.

In the operation of the device the helical spring 31 acts upon the piston to raise the same and since the piston is connected by the arm 15 to the rock shaft 6 the spring causes the rock shaft to raise the arm 7 sufficiently to maintain the flexible connection 8 always taut, when therefore the wheel of the vehicle strikes an obstruction and raises the axle 4 against the action of the vehicle spring 2, the arm 7 will be caused by the spring 31 to rise and maintain the flexible member 8 taut during the upward movement of the axle so that it is in position immediately to check the downward movement of the axle relatively to the frame.

During the upward movement of the piston, fluid from the fluid chamber flows freely through the port 28 into the cylinder. When the arm 7 has reached the upward limit of its movement, through the impulse of the shock, the valve 32 closes the port 28 and upon the commencement of the reverse movement of the axle 4, under the influence of the vehicle spring 2, the piston is forced downwardly and thereby caused to force the fluid from the cylinder back into the fluid chamber.

Under slight shocks the port 40 provides a sufficient discharge for the fluid but under heavy shocks the downward movement of the piston displaces the valve 38 until the port 47 in the tubular portion thereof is carried beyond the end of the wall of the cylinder and thereby enabled to discharge the fluid from the port 47 into the fluid chamber.

As soon as the heavy pressure from the piston is relieved, which occurs when the vehicle spring 2 has forced the axle to almost a normal position the valve 38 is closed by its spring 44 and the remaining movement of the piston is controlled by the relatively slow discharge of the fluid from the cylinder through a smaller port 40.

In order to provide means whereby the hollow piston may be filled with oil and to prevent the formation of an air cushion beneath the piston and further to aid the action of the piston under slight shocks, a vent 48 is provided in the piston head, this vent desirably is controlled by a ball valve 50 located in an enlarged aperture 51 in said head, the ball valve being retained in the aperture by a screw threaded plug 52 having a central bore 53. This construction also provides a means whereby oil is squirted into the interior portion of the casing and falling upon the rocker arm 15 serves to maintain the journals of the rock shaft in a sufficient state of lubrication even though the oil in the fluid chamber is well below the level of the rock shaft 6.

Fluid, preferably oil, may be introduced into the casing by removing the top 54 thereof which is conveniently secured upon the casing by bolts 55 but the casing may be provided with a filling port 56 located near the top of the casing but a sufficient distance below the same to provide an air space above the surface of the fluid.

Inasmuch as shock absorbers for automobiles are to be applied both to the front and rear axles, pairs of shock absorbers in which the rock shafts operate in opposite directions must be provided. In order to economize in the construction of such shock absorbers the arm 7 may be symmetrical so as to adapt it for use either with the right hand or left hand type of shock absorber.

As illustrated herein the arm 7 is flat and is provided with central longitudinally extending ribs 57, 58. The arm desirably is offset laterally to bring its end substantially into the plane of the axis of the rocker arm 15 and the end of the arm 7 is provided with a flattened portion 59.

The flexible member 8 may be secured to it it by a clamping plate 60 secured to the flattened portion 59 by suitable bolts 61. A guide strap 62 having a curved end portion desirably is clamped upon the flattened end portion 59 of the arm beneath the flexible member 8 so as to avoid abrupt bending of the flexible member and consequent injury thereto.

It will be understood that the embodiment of the invention disclosed herein is illustrative merely and that the invention may be incorporated in other forms and that various changes in the construction thereof may be made within the spirit and scope of the following claims.

Having thus described my invention what I claim as new and desire to secure by Letters Patent is;

1. A shock absorber for cushioning the movement of two relatively movable members comprising a casing adapted to be secured to one of said members presenting a fluid chamber and a cylinder, a piston reciprocable in said cylinder, a rock shaft having arms connected respectively to said piston and to the other relatively movable member, means for establishing a free flow of fluid from said fluid chamber into said cylinder in response to the movement of the piston in one direction only and a resiliently actuated unbalanced valve for restricting the flow of fluid from the cylinder to the fluid chamber whereby the movement of the piston in the other direction will be impeded and the shock of sudden movement dissipated.

2. A shock absorber for cushioning the movement of two relatively movable members comprising a casing adapted to be secured to one of said members presenting a fluid chamber and a cylinder, a piston reciprocable in said cylinder, a rock shaft having two arms, means connecting one of said arms to said piston, flexible means connecting the other arm to the other relatively movable member and means for normally maintaining said flexible member taut, means for establishing a free flow of fluid from said fluid chamber into said cylinder in response to the movement of the piston in one direction only and a spring actuated unbalanced valve for restricting the flow of fluid from the cylinder to the fluid chamber whereby the movement of the piston in the other direction will be impeded and the shock of sudden movement dissipated.

3. A shock absorber for cushioning the movement of two relatively movable members comprising a casing adapted to be secured to one of said members and presenting a fluid chamber and a cylinder having integral walls, a piston in said cylinder, means including a flexible instrumentality adapted to connect said piston to the other relatively movable member, a spring within said cylinder acting upon said piston to maintain said flexible instrumentality taut, said cylinder wall having an inlet port leading from said fluid chamber to said cylinder, a valve in said port acting to permit a free flow of the fluid from the fluid chamber into the cylinder in response to the movement of the piston in one direction only, and an independent spring actuated valve acting to restrict the flow of fluid from the cylinder to the fluid chamber during the movement of the piston in the opposite direction.

4. A shock absorber for cushioning the movement of two relatively movable members comprising a casing adapted to be secured to one of said members and presenting a fluid chamber and a cylinder having integral walls, a piston in said cylinder, means including a flexible instrumentality adapted to connect said piston to the other relatively movable member, a spring within said cylinder acting upon said piston to maintain said flexible instrumentality taut, said cylinder wall having an inlet port leading from said fluid chamber to said cylinder, a valve in said port acting to permit a free flow of the fluid from the fluid chamber into the cylinder in response to the movement of the piston in one direction only, an independent spring actuated valve acting to restrict the flow of fluid from the cylinder to the fluid chamber during the movement of the piston in the opposite direction, and means for adjusting said spring whereby the resistance of said spring actuated valve to the flow of fluid through it may be regulated.

5. A shock absorber for cushioning the movement of two relatively movable members comprising a casing adapted to be secured to one of said members and presenting a fluid chamber and a cylinder, said cylinder having an inlet port leading from said fluid chamber to said cylinder, a piston in said cylinder, means including a flexible instrumentality adapted to connect said piston to the other relatively movable member, a valve cage in said cylinder having a flange surrounding said port, a valve in said cage adapted to open freely upon upward movement of the piston, a helical spring seated upon said flange engaging said piston and acting to raise said piston and thereby to maintain said flexible instrumentality taut during the movement of said relatively movable members in one direction, and yieldable means for restricting the flow of fluid from the cylinder to the fluid chamber upon movement of the piston in the opposite direction.

6. A shock absorber for cushioning the movement of two relatively movable members comprising a casing adapted to be secured to one of said members presenting a fluid chamber and an integral cylinder inclosed therein, said cylinder having an inlet port leading from said fluid chamber to said cylinder, a valve in said port adapted to permit the free flow of fluid from said fluid chamber to said cylinder, a piston in said cylinder, means for connecting said piston to the other relatively movable member, a helical spring in said cylinder operating normally to raise said piston, the wall of said cylinder having a discharge port below said piston, and a spring actuated valve for said discharge port adapted to impede the flow of fluid from said cylinder to said fluid chamber, and yieldable in response to heavy pressure imposed by said piston upon the fluid within said chamber.

7. A shock absorber for cushioning the movement of two relatively movable members comprising a casing adapted to be secured to one of said members presenting a fluid chamber and an integral cylinder inclosed therein, said cylinder having an inlet port leading from said fluid chamber to said cylinder below said piston, a valve in said port adapted to permit the free flow of fluid from said fluid chamber to said cylinder, a piston in said cylinder, means for connecting said piston to the other relatively movable member, a helical spring in said cylinder operating normally to raise said piston, the wall of said cylinder having a discharge port below said piston, and a spring actuated tubular valve telescopically seated in said discharge port and having an opening in its tubular portion normally located within the wall of said discharge port but adapted to discharge fluid from said cylinder into said fluid chamber when the valve is actuated by heavy pressure upon the liquid within the cylinder.

8. A shock absorber for cushioning the movement of two relatively movable members comprising a casing adapted to be secured to one of said members presenting a fluid chamber and an integral cylinder inclosed therein, said cylinder having an inlet port leading from said fluid chamber to said cylinder, a valve in said port adapted to permit the free flow of fluid from said fluid chamber to said cylinder, a piston in said cylinder, means for connecting said piston to the other relatively movable member, a helical spring in said cylinder operating normally to raise said piston, the wall of said cylinder having a discharge port below said piston, a tubular valve telescopically seated in said lateral port having an opening in its tubular portion normally located within the wall of said discharge port, a valve stem, and a bushing of greater diameter than that of said valve seated in said casing and having a guideway for said valve stem and a helical spring surrounding said valve stem seated against said bushing and said valve.

9. A shock absorber for cushioning the movement of two relatively movable members comprising a casing adapted to be secured to one of said members presenting a fluid chamber and an integral cylinder inclosed therein, the head of said cylinder having an inlet port leading from said fluid chamber to said cylinder, a valve in said port adapted to permit the free flow of fluid from said fluid chamber to said cylinder, a piston in said cylinder, means for connecting said piston to the other relatively movable member, a helical spring in said cylinder operating normally to raise said piston, the wall of said cylinder having a discharge port below said piston, a tubular valve telescopically seated in said discharge port having a small by-pass leading from the cylinder to said fluid chamber and a large opening in said tubular portion normally located within the wall of said discharge port, a screw threaded bushing of greater diameter than said valve engaging coöperating screw threaded walls of an aperture extending through said casing and having a central guideway for said valve stem, a helical spring surrounding said valve stem seated at one end against said bushing and at the other against said valve and means for retaining said bushing in adjusted position whereby the compression of said spring may be regulated.

10. A shock absorber for vehicles comprising a casing adapted to be secured to the frame of a vehicle, said casing presenting a fluid chamber and an integral inclosed cylinder, said cylinder having an inlet port leading from said fluid chamber into the lower portion of said cylinder, a valve in said port adapted to permit free flow of fluid from said fluid chamber to said cylinder in one direction, a hollow piston in said cylinder, a spring in said piston acting normally to raise the same, a rock shaft having an arm secured to said piston, a flexible member connected to another arm of said rock shaft and adapted to engage the axle of the vehicle, and means for restricting the flow of fluid from the cylinder into the fluid chamber whereby the downward movement of the piston will be impeded.

11. A shock absorber for cushioning the movement between two relatively movable members comprising a casing adapted to be secured to one of said members having a fluid chamber and a cylinder, a piston in said cylinder, means for securing the piston to the other relatively movable member, said cylinder having an inlet port leading from said fluid chamber to said cylinder, means for permitting the liquid to flow freely from the fluid chamber into said cylinder and to prevent it from flowing in the reverse direction, and an independent resiliently actuated unbalanced valve for regulating the flow of fluid from the cylinder to the fluid chamber.

12. A shock absorber for cushioning the movement between two relatively movable members comprising a casing, adapted to be secured to one of said members having a fluid chamber and a cylinder, means for connecting said piston to the other relatively movable member, said cylinder having an inlet port leading from said fluid chamber to said cylinder, a valve for said port adapted to permit the fluid to pass from the fluid chamber into the cylinder only, said cylinder having also a discharge port leading from said cylinder to said fluid chamber, and a yieldable valve in said discharge port having a discharge aperture the effective area of which is adapted to be increased or diminished by the movement of the piston to permit a more or less rapid discharge of the fluid from the cylinder in proportion to the pressure imposed upon the piston.

13. A shock absorber for cushioning the movement between two relatively movable members comprising a casing adapted to be secured to one of said members having a fluid chamber and a cylinder, means for connecting said piston to the other relatively movable member, said cylinder having an inlet port leading from said fluid chamber to said cylinder, a valve for said port adapted to permit the fluid to pass from the fluid chamber into the cylinder only, said cylinder also having a discharge port leading to said fluid chamber, a tubular valve for said discharge port having a lateral aperture and yieldable means normally acting to close said valve.

14. A shock absorber for cushioning the movement between two relatively movable members comprising a casing adapted to be secured to one of said members having a fluid chamber and a cylinder, means for connecting said piston to the other relatively movable member, said cylinder having an inlet port leading from said fluid chamber to said cylinder, a valve for said port adapted to permit the fluid to pass from the fluid chamber into the cylinder only, said cylinder also having a discharge port leading to said fluid chamber, a valve in said discharge port having an aperture normally communicating with said fluid chamber and a larger aperture normally closed by the wall of said port, and a spring for holding said valve normally seated but yieldable under great pressure imposed upon the piston to permit the opening of the valve whereby fluid may be discharged through the larger opening therein.

15. A shock absorber for cushioning the movement between two relatively movable members comprising a casing adapted to be secured to one of said members having a fluid chamber and a cylinder, means for connecting said piston to the other relatively movable member, said cylinder having an inlet port leading from said fluid chamber to said cylinder, a valve for said port adapted to permit the fluid to pass from the fluid chamber into the cylinder only, said cylinder also having a discharge port leading to said fluid chamber, a tubular valve in said discharge port having an aperture normally communicating with said fluid chamber and a larger aperture normally closed by the wall of said port, a spring for holding said valve normally seated but yieldable under great pressure imposed upon the piston to permit the opening of the valve whereby fluid may be discharged through the larger opening therein and means for adjusting the spring whereby the valve may be held closed with greater or less force.

16. A shock absorber for cushioning the movement of two relatively movable members comprising a casing adapted to be secured to one of said members presenting a fluid chamber and a cylinder, said cylinder having an admission port leading from said fluid chamber to said cylinder, and a valve for permitting fluid to flow freely from said fluid chamber into said cylinder, said cylinder also having a discharge valve for restricting the flow of fluid from said cylinder into said fluid chamber, said piston having a vent leading through its head adapted to permit the escape of air beneath the piston and to aid in the cushioning movement of said shock absorber.

17. In a shock absorber comprising a fluid chamber, a cylinder, means operable respectively to permit fluid to flow freely from said fluid chamber to said cylinder and to restrict the flow of said fluid from the cylinder to the fluid chamber, a piston in said cylinder, said piston having an aperture through its head and a valve in said aperture for permitting a restricted amount of fluid to flow from said cylinder upon pressure being applied to said piston.

18. A shock absorber for cushioning the movement of two relatively movable members comprising a casing adapted to be secured to one of said members and presenting a fluid chamber and a cylinder, said cylinder having an inlet port leading from said fluid chamber to said cylinder, a piston in said cylinder, means to connect said piston to the other relatively movable member, a valve cage in said cylinder having a flange surrounding said port, a valve in said cage adapted to open freely upon upward movement of the piston, resilient means seated upon said flange and engaging said piston, acting to raise said piston and to maintain said valve cage seated, and independent means for restricting the flow of fluid from the cylinder to the fluid chamber upon movement of the piston in the opposite direction.

In testimony whereof, I have signed my name to this specification.

RALPH M. LOVEJOY.